April 18, 1939. K. D. McMAHAN 2,155,279
FLUID FLOW CONTROL APPARATUS
Filed May 22, 1935 2 Sheets-Sheet 1
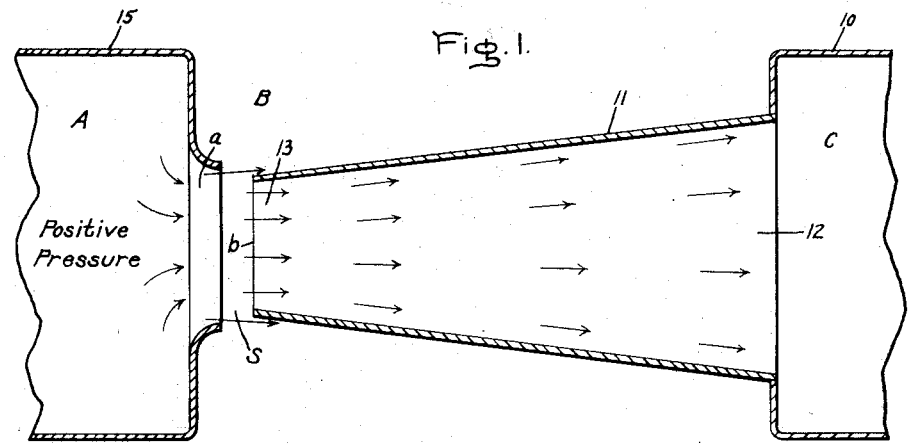
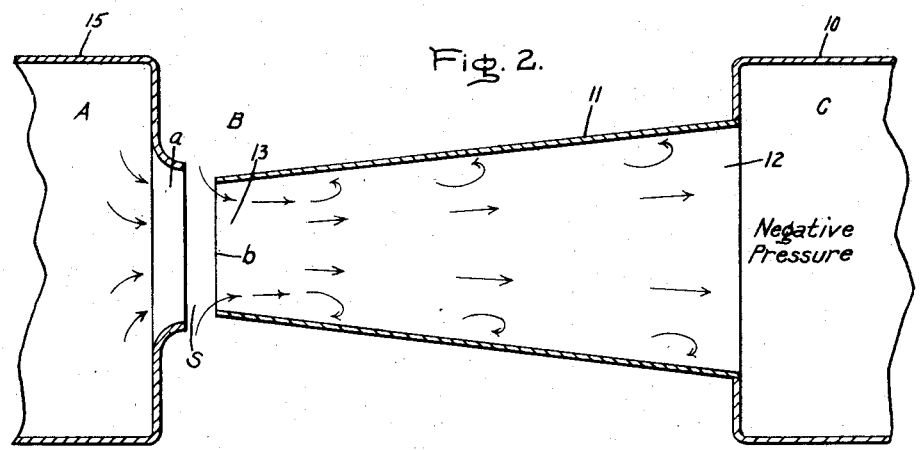
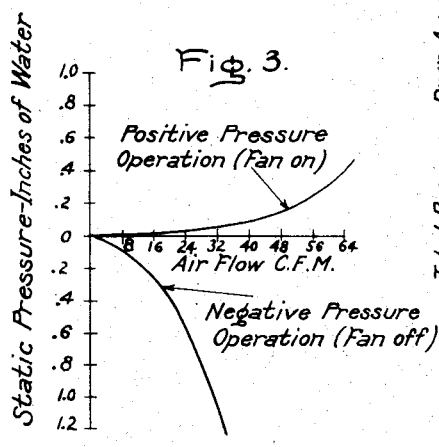
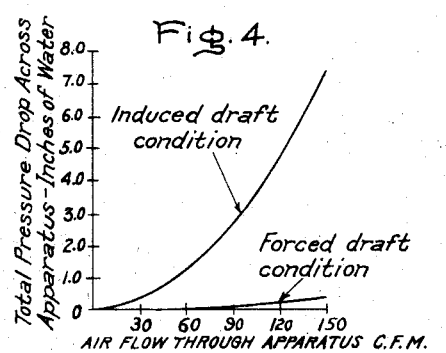
Inventor:
Kenton D. McMahan
by Harry E. Dunham
His Attorney

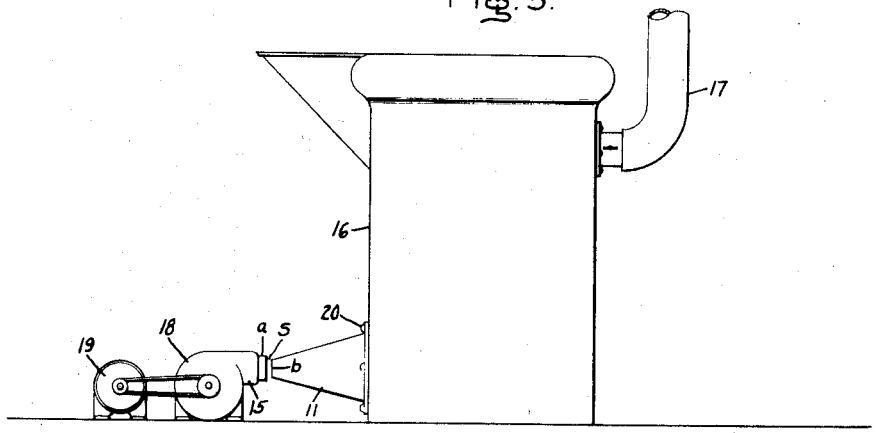
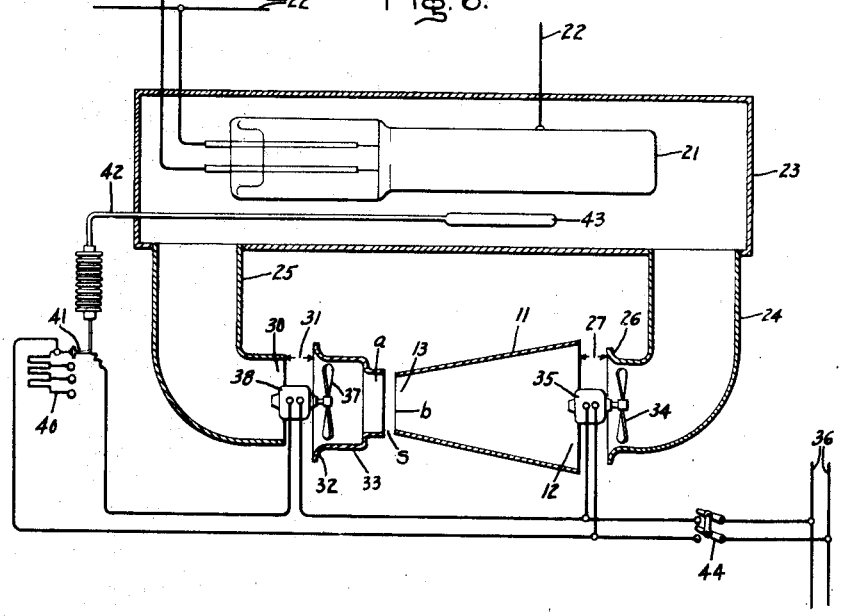

Patented Apr. 18, 1939

2,155,279

UNITED STATES PATENT OFFICE 2,155,279

FLUID FLOW CONTROL APPARATUS

Kenton D. McMahan, Schenectady, N. Y., assignor to General Electric Company, a corporation of New York Application May 22, 1935, Serial No. 22,751

5 Claims. (Cl. 110—72)

This invention relates to fluid flow control apparatus and particularly to improved variable impedance fluid flow control apparatus for controlling automatically a flow of a fluid in response to variation in the conditions producing the flow.

The result accomplished by the apparatus of the present invention is in effect the exact converse of the result accomplished by the invention set forth in my previous application, Serial No. 717,091, filed March 23, 1934, which application is assigned to the assignee of the present invention.

In order that the present invention may be clearly understood, the following principles are set forth: Bernoulli's theorem for fluid flow states that for any point in a fluid flow system Static head + velocity head + summation of losses = constant This equation indicates that flow through a fluid system may be regulated by controlling the magnitude of the head losses existing under different conditions. It is well known in the art that losses may be introduced into a fluid system in two ways: First, by the introduction of a sharp-edged or similar form of orifice having a low orifice coefficient; and second, by the introduction of a too sudden increase in the area of the flow path. In the first case, the loss is due to the contraction of the fluid stream on the discharge side of the orifice. In the second case, the loss depends upon the efficiency of converting velocity head into static head.

In the practice of my present invention, I provide in a fluid system a duct and a plurality of orifices in such cooperating relation therewith that under one set of pressure conditions fluid is delivered from a single source, or one of two independent sources, through certain of the orifices to the duct in such a manner that a minimum of contraction of the fluid stream is produced and the efficiency of conversion of velocity head to static head is a maximum; and that, under another set of pressure conditions, fluid is delivered from the single source, or from the other of the two independent sources as the case may be, through certain others of the orifices to the duct in such manner that a maximum of contraction of the fluid stream is produced and the efficiency of conversion of velocity head to static head is a minimum.

Of the various embodiments of which my invention is capable, the ones herein illustrated and specifically described have been selected as exhibiting the invention in its most convenient and effective form, and as forming the basis for insuring a complete understanding of the principles underlying the invention in order that one skilled in the art may perceive other applications and properly adapt the illustrated embodiments to various conditions of operation.

With particular reference to one of the illustrated embodiments, a specific object of my invention is the provision of furnace draft control apparatus wherein substantially no impedance is imposed to the supplying of air to the furnace under forced draft and a relatively high degree of impedance is imposed to the supplying of air to the furnace under induced draft.

With reference to the other of the illustrated embodiments, a specific object of my invention is the provision in a ventilation system for a given enclosure the temperature of which it is desired to control, of improved apparatus for automatically controlling the proportions of fresh and recirculated air supplied to the enclosure in accordance with variations in the temperature within the enclosure.

Further objects of my invention and the details of the manner in which the invention is carried out will be made clear by the following description taken in conjunction with the accompanying drawings in which:

Figs. 1 and 2 diagrammatically illustrate in longitudinal section the general form and arrangement of apparatus for practicing my invention, the form of fluid flow under different conditions being represented in the figures by arrows;

Figs. 3 and 4 represent curves of certain operational characteristics of apparatus such as that illustrated in Figs. 1 and 2;

Fig. 5 diagrammatically illustrates an embodiment of my invention as applied to furnace draft control, and Fig. 6 diagrammatically illustrates another embodiment of my invention as applied to the control of the recirculation of fluid in a cooling system.

Referring to Figs. 1 and 2, 10 designates a fluid receiving casing in the interior C of which a negative pressure (pressure below atmospheric) may be produced by any suitable form of suction device (not shown). 11 represents a duct for supplying fluid, such as air, to the interior of the casing 10. This duct may assume various forms in the practice of my invention but is illustrated in its preferred embodiment as being in the form of a truncated cone having smooth walls diverging from its inlet or throat 13 to its outlet or mouth 12, which is in communication with the interior of the casing 10. The duct 11 constitutes one form of a diffuser which is a device well known in the art for converting velocity head of a fluid stream into static head. In order that such a diffuser be efficient in its operation, its structural characteristics must be such that the outer portions of a fluid stream flowing therethrough follow along the sides thereof in the form of substantially continuous unidirectional streams. In other words, the circumferential flow must be substantially laminar without the formation of eddies along the inner surfaces of the diffuser. To make the fluid follow the sides, the area must increase very gradually, and there must be no conditions present which cause eddies to form at the inlet of the diffuser. In accordance with well known principles, the walls of the diffuser illustrated are made to have an angle with the axis of the diffuser which is less than that at which the outer laminae of a fluid stream entering the throat 13 substantially uniformly distributed across the area of the throat with all portions thereof flowing at substantially equal velocity and along lines substantially parallel to the axis of the diffuser, will cease to contact the walls of the diffuser.

The throat 13 of the diffuser 11 is provided with an inlet orifice $b$ which has a sharp edge on the inlet side thereof and is therefore of the type commonly designated as sharp-edged. It is well known in the art that such sharp-edged orifice has a relatively low orifice coefficient for the normal flow of fluid therethrough from a body of fluid which is in extended contact with the margin of the orifice on the inlet side thereof. Eddy currents are produced at the inlet of the diffuser by the rapid increase in the area of the actual fluid flow path through the diffuser which is introduced by the contraction of the fluid stream entering the throat 13 at an angle to the axis of the diffuser through the sharp edges of orifice $b$.

Numeral 15 designates a supply casing 15 the interior space A of which may be subjected to positive pressure (pressure above atmospheric) by any suitable means such as a blower (not shown). The casing 15 is provided with a discharge opening $a$ which is separated from the throat of the diffuser 11 by a space designated on the drawings as S, and which is in axial alignment with the diffuser in order that fluid may be projected from the casing through the opening $a$ into the orifice $b$. For reasons hereinafter to be given more fully, it is preferable that the opening $a$ be of the round-edged type, which has a relatively high orifice coefficient, and also that the orifice $a$ have a slightly larger area than that of the orifice $b$ forming the inlet of the diffuser and have a circular cross-sectional shape to correspond to the circular cross-section of the diffuser.

For the purpose of describing the operation of the apparatus illustrated in Figs. 1 and 2, it will be assumed that the apparatus is to be employed to control the supply of air to the space C interiorly of the casing 10 from the space A interiorly of the casing 15 and from the atmosphere, designated as the space B surrounding the apparatus. If the interior of casing 15 is subjected to positive pressure, air is discharged therefrom through the orifice $a$ into the throat 13 of the diffuser 11. Also, if the interior of casing 10 is subjected to negative pressure, there is a tendency for air to be drawn into the throat of the diffuser through the space S from atmosphere, and, as will be pointed out hereinafter, the amount of air drawn in from atmosphere depends principally upon the difference between the pressure of space A and of space B.

The operation of the apparatus will be more clearly understood by reference to the arrows shown in Figs. 1 and 2. When the interior C of casing 10 is under negative pressure and the interior A of casing 15 is under positive pressure, a stream of air is discharged through orifice $a$ into the throat 13 of the diffuser 11 as shown by the arrows in Fig. 1 which are representative of the flow lines of the air stream. Since in the illustrated embodiment the orifice $a$ is slightly larger than the orifice $b$ and has the same cross-sectional shape, the rim of the orifice $b$ operates to core out the central portion of the stream discharged from the orifice $a$ and the outside portions or laminae of the stream are discharged outwardly through the space S and flow along the outer wall of the diffuser. This outer portion of the air stream flowing on the outside of the diffuser overcomes or blocks any tendency for air to be entrained into the inlet of the diffuser from the atmosphere B through the space S by means of the injector action of the stream flowing through the inlet of the diffuser. Consequently, the central portion of the stream flows into the inlet of the diffuser and is substantially uniformly distributed across the area thereof with all portions of the stream flowing at substantially uniform velocity and along lines substantially parallel to the axis of the diffuser. By proper adjustment of the sizes of orifices $a$ and $b$ and of space S with relation to each other, the discharge of air externally of the throat of the diffuser may be reduced to a minimum while the blocking effect thereof is maintained. Under these conditions the orifice $a$ in effect becomes the inlet of the diffuser since practically all of the air discharged from the orifice $a$ enters the inlet $b$ of the diffuser.

Under the conditions of flow at uniform velocity and along lines substantially parallel to the axis of the inlet $b$ outlined in the previous paragraph the inlet orifice coefficient of the diffuser is only a little less than unity. This is due to the fact that, the stream of air enters the throat of the diffuser with very slight loss in head and with substantially no contraction. Also the diffuser being designed as previously pointed out so that it has maximum efficiency of operation when a fluid stream enters the throat thereof as just described, there being no eddy currents introduced at the inlet thereof and the fluid stream flowing smoothly therethrough as indicated by the arrows in Fig. 1, the loss in head across the diffuser is a minimum. Consequently, under the positive pressure conditions a minimum of impedance is imposed to flow of air from the interior of the casing 15 to the interior of the casing 10, and for a given pressure drop across the apparatus a maximum fluid flow is secured.

On the other hand, when the interior A of the casing 15 is under atmospheric pressure and the interior C of the casing 10 is under negative pressure, a stream of air is no longer discharged from the orifice $a$ into the throat 13 of the diffuser 11 in the manner previously described and the flow of air into the throat of the diffuser from atmosphere B through the space S is no longer blocked off. The orifice $b$ becomes the effective inlet of the diffuser and the air flows from atmosphere into the diffuser at a relatively large angle to the axis thereof, as indicated by the arrows in Fig. 2, so that the low orifice coefficient at the diffuser inlet results in an appreciably larger loss in head at the inlet than was the case under the positive pressure conditions outlined in the previous paragraph. In addition the contraction of the air stream entering the diffuser through the orifice $b$ produces eddy currents along the walls of the diffuser, as indicated by the arrows, which impede the flow of air through the diffuser and cause inefficient operation of the diffuser and a consequent large loss in head thereacross. The total loss in head across the apparatus under the negative pressure conditions due to the effect of the sharp-edged orifice and the inefficient operation of the diffuser is many times larger than the total loss across the apparatus under the positive pressure conditions.

In Figs. 3 and 4 are illustrated curves which represent the results of tests and calculations based on operation of flow control apparatus constructed in accordance with my invention. From these curves it may be ascertained that the magnitudes of negative pressure required to produce given rates of air flow through the apparatus are in the neighborhood of 18 to 20 times greater than the magnitudes of positive pressure necessary to produce the same rates of air flow through the apparatus.

When the space C is subjected to a constant negative pressure at the same time that the space A is subjected to a variable positive pressure, as the pressure within the space A decreases the force of the discharge through the orifice a also decreases with resultant decrease in the blocking effect produced thereby at the space designated S. A point is reached at which air begins to flow in increasing quantities through space S from atmosphere into the throat 13 of the diffuser 11 and the impedance to the flow of air through the diffuser thereafter increases as the pressure in space A decreases. Hence it will be seen that variation of the differential between the pressures of space A and space B intermediate zero differential and the differential at which air begins to flow into the diffuser inlet from space B, produces variation in the impedance to flow through the diffuser which is inversely in proportion to a function of the differential.

From an understanding of the principles underlying my invention, as set forth in the foregoing discussion, it will be evident to one skilled in the art that the invention is not limited to the illustrated details of the discharge orifice a, space S, and supply duct 11, and that the apparatus for practicing the invention may take various forms whereby may be secured different degrees of variation in impedance or restriction of the fluid flow through the apparatus upon changeover from positive to negative pressure conditions or vice versa. It will also be evident that the invention may be employed with equal advantage in controlling the flow of a fluid other than air, in which case the space A within the casing 15 may be supplied with fluid of one kind and the space B may constitute a second source of fluid of a different kind in communication with the inlet of the duct 11 by any suitable means corresponding to the space S. The terms "positive pressure" and "negative pressure" are herein used in a relative sense since, when referred to the scale of absolute pressure, pressures above and below atmospheric are in effect positive pressures of different magnitudes. Keeping this in mind, it is evident that apparatus constructed in accordance with the present invention will function equally well in cases where the space C is subjected to a given positive pressure while spaces A and B are subjected to given higher positive pressure and the positive pressure of space A is varied relative to that of space B.

In Fig. 5 an embodiment of my invention is illustrated as employed for controlling the draft or supply of combustion air to a furnace 16 provided with a flue or stack connection 17 which in accordance with well known principles is effective during operation of the furnace to produce an induced draft through the furnace. 18 designates a blower which is employed for supplying forced draft to the furnace. The blower is driven in any suitable manner as by means of electric motor 19. In the application of the invention to the furnace draft control, it is desired to produce (1), low impedance to flow of air through the furnace under positive pressure produced by the blower, and (2), very high impedance to flow of air through the furnace under negative pressure produced by the stack. It is desired to have minimum head losses incident to the supply of combustion air to the furnace under forced draft in order that the blower unit producing the forced draft may be as small as possible. However, if the air flow into the furnace when produced by induced draft only, follows the same course as that produced by operation of the blower, the loss in head is of course still small. This is considered objectionable because the air flow caused by natural draft when the stack is still hot, immediately after shutdown of the blower and the furnace, would approach that caused by forced draft. This would result in too rapid burning of fuel within the interior of the furnace after shutdown thereof and would lead to overshooting. It is, therefore, desirable to have a minimum of impedance or restriction imposed to the supplying of air to the furnace by means of the blower and a maximum of impedance or restriction imposed to the drawing of air through the furnace by means of the induced draft producing stack when the blower is not in operation.

Referring again to Fig. 5, 11 designates the supply duct or diffuser of my invention mounted in any suitable manner, as by means of bolts indicated at 20, with its mouth or outlet in sealed communication with the draft opening of the furnace 16. The nozzle of the blower 18 corresponds to the previously referred to casing 15 and is so designated. This nozzle is provided with round-edged discharge orifice a in spaced axially aligned relationship with the inlet orifice b of the diffuser 11.

The flow control apparatus illustrated in Fig. 5 operates in the same manner as that illustrated in Figs. 1 and 2. When the furnace is in operation and the blower 18 is operating to supply combustion air thereto, a stream of air is discharged under pressure from the nozzle casing 15 and orifice a into the inlet orifice b of the diffuser 11 and thence through the diffuser into the interior of the furnace. As previously outlined, under these conditions the impedance imposed to flow of air through the supply duct or diffuser is a minimum and hence a maximum amount of air is forced therethrough by a given pressure drop created by operation of the blower. Upon shutdown of the furnace and cessation of operation of the blower, the space S is no longer blocked off by the discharge from the orifice a and air flows therethrough from the atmosphere into the inlet orifice b of the diffuser, thereby producing an impedance to the flow of air through the diffuser which is materially greater than that which would be imposed by the inoperative fan. Under these last conditions the rate of flow of air through the stack is a minimum for a pressure drop corresponding to the given pressure drop referred to above but produced by action of the draft inducing stack 17. It will thus be seen that the flow control apparatus functions automatically and without the use of moving parts as a damper for producing very sensitive regulation of the supply of air to the furnace.

As an aid to a complete understanding of the method of constructing an improved flow control apparatus in accordance with my invention, the following calculations are given as illustrative of the manner of deriving the mathematical equations upon which such construction depends. It will be assumed that it is desired to know the characteristics of apparatus such as that illustrated in Figs. 1, 2 and 5, and, further, it will be assumed that:

1. The change in density of the air during its flow through the apparatus is negligible. This assumption is ordinarily used in dealing with problems of air flow in which pressure changes are small and velocities involved are comparatively low, such as in machine ventilation problems.

2. Atmospheric conditions are assumed as,

Temperature = 70° F.
Pressure = 14.7 lbs. per sq. in.

3. Gravity effects are negligible.

The following nomenclature will be used in the calculations:

$A_2$ = Orifice area in sq. ft. This denotes the orifice $a$ which is equivalent under particular conditions to the inlet of the diffuser. As previously stated, orifice $a$ is the equivalent inlet under positive pressure conditions and orifice $b$ is the effective inlet under negative pressure conditions.

$A_3$ = Area at outlet end of diffuser in sq. ft.
$Q$ = Discharge in cubic ft. per minute.
$\rho$ = Density of air.
$C$ = Orifice coefficient.
$E$ = Diffuser efficiency which may be defined as the ratio of the change of static head to the change of velocity head through the diffuser.
$h$ = Velocity head in inches of water.
$p$ = Static pressure head in inches of water.
$H$ = total head = $p + h$.

Subscripts 1, 2, and 3 denote conditions before entering orifice $A_2$, immediately after leaving orifice $A_2$, and at the outlet of the diffuser respectively.

Under the atmospheric conditions assumed the orifice coefficient $C$ may be determined from the following equation:

$$Q = 4010 CA \sqrt{P}$$

where
$Q$ = Air flow in cubic feet per minute,
$A$ = Area of orifice in sq. ft.,
$P$ = Pressure drop across the orifice in inches of water. This equation $$Q = 4010 CA \sqrt{P}$$

is derived from the standard fluid flow equation $$V = \sqrt{2gH}$$

and the constant 4010 represents the combination of all the conversion factors involved.

Also for the atmospheric conditions assumed, the velocity head may be written:

(1) $\quad h = \left(\dfrac{U}{4010}\right)^2$ inches of water, and, since $$U = \dfrac{Q}{A}$$

(2) $\quad h = \left(\dfrac{Q}{4010A}\right)^2$ inches of water.

Directly from the definition of diffuser efficiency the total loss of head in the diffuser may be written:

$$_2H_3 = (1-E)\ (_2h_3)$$

or (3) $\quad _2H_3 = (1-E)\left(\dfrac{Q}{4010}\right)^2\left(\dfrac{1}{A_2^2} - \dfrac{1}{A_3^2}\right)$ inches of water.

In the equation above given for determining the orifice coefficient and which is as follows:

(4) $\quad Q = 4010 CA_T \sqrt{P}$ the quantity "P" is the total loss in head across the orifice plus the dynamic head on the exit side, or (5) $\quad P = {_1H_2} + \left(\dfrac{Q}{4010A_2}\right)^2$ inches of water.

Directly from (4) and (5) the total loss in head across the orifice is (6) $\quad _1H_2 = \left(\dfrac{Q}{4010A_2}\right)^2\left(\dfrac{1}{C^2} - 1\right)$ inches of water.

Adding Equations (3) and (6), the total loss of head is (7) $\quad _1H_3 = \left(\dfrac{Q}{4010}\right)^2\left[\dfrac{1}{A_3^2}(E-1) + \dfrac{1}{A_2^2}\left(\dfrac{1}{C^2} - E\right)\right]$ inches of water.

The calculations of pressure drop for various values of Q may be made directly from Equation (7). It will be seen that the only difference in the Equation (7) for the cases of the blower operating and not operating is in the values of "C" and "E", since for the purposes of these calculations it may be assumed that the value of $A_2$ (which is the effective inlet area of the diffuser for the particular operating conditions) is the same for both cases.

The characteristics of apparatus constructed in accordance with my invention may be ascertained by substitution of the essential physical dimensions in Equation (7). For example, an apparatus will be taken having a diffuser the dimensions of which are as follows: diameter at inlet (orifice $bb$), 2 in.; diameter at outlet (mouth 12), 4 in.; angle of walls of diffuser with axis thereof, 7°. With reference to this last dimension, it has been found that the angle of 7° approaches the maximum value for which the diffuser operates efficiently without eddy currents being formed when fluid is discharged into the inlet thereof in the form of a stream substantially uniformly distributed over the inlet with all portions of the stream flowing at substantially uniform velocity and along lines substantially parallel to the axis. From data familiar in the art the values of the orifice coefficients may be found to approximate 0.98 for the round-edged orifice $a$ and 0.60 for the sharp-edged orifice $b$. A spacing of ½ in. between the two orifices is provided. From empirical data it may be determined that the efficiency of a diffuser having the above characteristics is approximately 90% when a stream of air is discharged into the inlet orifice $b$ in the manner above described, and is approximately 25% when air is being drawn into the inlet orifice $b$ through the space S.

Then, taking the numerical values of the diameters of $A_2$ and $A_3$ as 2 in. and 4 in. respectively, Equation (7) may be reduced to:

(8) $\quad 1^H3 = 1.308 \times 10^{-4} Q^2 \left[ \dfrac{1}{C^2} - .0625 - .9375E \right]$ inches of water.

As previously stated, when the blower is operating the round-edged orifice $a$ is the effective inlet of the diffuser and this has an orifice coefficient $C=0.98$. Also under these conditions the value of the diffuser efficiency $E=0.90$. Using these numerical values, the equation for the total head loss across the apparatus with the blower operating is as follows:

(9) $\quad 1^H3 = 1.77 \times 10^{-5} \, Q^2$ inches of water.

When the blower is not operating, the orifice $b$ becomes the effective inlet of the diffuser and the orifice coefficient $C$ thereof, as previously stated is 0.60. Also from the data previously given the diffuser efficiency $E$ under these conditions equals 0.25. Using these numerical values in Equation (8) the equation for the total losses across the apparatus is as follows:

(10) $\quad 1^H3 = 3.24 \times 10^{-4} \, Q^2$ inches of water.

From Equations (9) and (10), curves such as those represented in Fig. 4 may be plotted to determine the values of pressure drop corresponding to rates of air flow ranging between zero and 150 cu. ft. per minute, both with the blower operating and with the blower not operating in the case of furnace draft control employing apparatus having the dimensions above given.

From Equation (8) using the dimensions specified, it will be seen that the total loss in head across the apparatus under each of the operating conditions is proportional to the quantity $$Q^2 \left[ \dfrac{1}{C^2} - .0625 - .9375E \right]$$

Substituting the values of $C$ and $E$ which were specified for the conditions incident to operation and non-operation of the blower, it is found that with the blower not operating the pressure drop across the apparatus is 18.3 times the pressure drop across the apparatus with the blower operating for the same rates of air flow. Or, in other words, for a given pressure drop the rate of air flow with the blower operating is 4.27 times the rate of flow with the blower not operating. Thus it may be seen that when the blower is stopped the air flow decreases to less than 24% of its former value.

A second embodiment of my invention is diagrammatically illustrated in Fig. 6 as employed for controlling the recirculation of air in a cooling system. The element designated by the numeral 21 represents an electric discharge device which is excited from electrical supply lines 22 and which gives off heat during operation. It is to be understood that such a device is shown for purposes of illustration only and there may be substituted therefor any other heat dissipating device the temperature of which it is desired to maintain within given limits by the circulation of air thereover. The heat dissipating device is enclosed by means of casing 23 which is provided with intake and exhaust means illustrated as being in the form of ducts 24 and 25 respectively. These ducts are so constructed that their open ends are in spaced apart opposed relation. The duct 24 is provided with an inwardly converging bell-shaped inlet opening 26 which facilitates the smooth flow of air thereinto. 11 designates a supply duct or diffuser having the characteristics previously described. This duct is mounted with its mouth or outlet 12 in opposed relation to the inlet 26 of the duct 24 and is spaced therefrom as indicated at 27. For best operation of the apparatus it is preferable though not necessary that the outlet 12 of the diffuser be of equal or slightly greater area than that of the inlet 26 of the duct 24. The throat 13 of the diffuser extends into atmosphere and, as previously described, is provided with sharp-edged inlet orifice $b$.

In opposed relation to the outlet 30 of the exhaust duct 25 and spaced therefrom as indicated at 31 is the inwardly converging bell-shaped inlet 32 of a fluid conduit 33 the outlet of which is in the form of a round-edged discharge orifice $a$ in axial alignment with the diffuser 11 and spaced from the inlet thereof as indicated at S. It is preferable though not necessary that the inlet 32 of the conduit 33 have a slightly greater area than the outlet 30 of the exhaust duct 25.

In order to circulate air through the casing 23 and over the heat dissipating device 21, a fan 34 is provided in the intake duct 24 adjacent the inlet 26 thereof and is driven by means of electric motor 35, or other suitable means, which is connected to be energized from electric supply lines 36. A similar fan 37 is located in the conduit 33 adjacent the inlet 32 thereof and is arranged to be driven by means of electric motor 38, or other suitable means, which is also connected to be energized from the supply lines 36. Motor 35 is connected directly to the supply lines 36 in order that when energized it rotates at constant speed to force a constant volume of fluid into the intake duct 24 and through the casing 23. On the other hand, it is desirable for reasons to be given hereinafter that the fan 37 be operated at different speeds and hence the motor 38 is connected to the supply lines 36 through a variable resistance or similar speed-control device 40, or similar device, and movable contact 41. The contact 41 is mounted on the movable end of thermostatic device 42 which is represented as being of the expansible fluid bellows type having one end 43 thereof extending within the casing 23 in proximity to the electrical discharge device 21 to be responsive to the heat dissipated therefrom during operation. The resistance 40, contact 41 and thermostatic device 42 constitute a thermal responsive control device for the motor 38. Both the motor 35 and the motor 38 may be disconnected from the supply line 36 by means of the manually operable switch 44.

The purpose of the apparatus illustrated in Fig. 6 is to maintain the electric discharge device 21 at a certain constant temperature or within a certain temperature range regardless of the ambient temperature outside the casing 23. This is accomplished by varying the proportions of recirculated air and make-up air supplied to the casing by the fan 34. Under certain conditions the amount of recirculated air must be substantially zero and for other conditions the amount of make-up air must be substantially zero. Intermediate the extreme conditions it is desirable to obtain variations of the relative proportions of recirculated and make-up air in accordance with variations in the load conditions on the electric discharge device and variations in the ambient temperature surrounding the casing 23. Fan 34 and motor 35 operate at constant speed, when the switch 44 is closed, to supply a constant volume of cooling air through the system. The function of the fan 37 and motor 38 is to control the proportions of recirculated air and fresh air supplied to the casing 23. The energization of the motor 38 and the speed of operation of the fan 37 are controlled by means of the cooperative action of the variable resistance 40 and movable contact 41 which is movable in accordance with temperature variations within the casing 23.

The thermostatic device 42 is so adjusted that when the electric discharge device 21 is operating at a proper temperature, all of the resistance 40 is cut out and the motor 38 receives maximum excitation which results in the rotation of the fan 37 at maximum speed. Under these conditions the fan 37 draws a large volume of spent or recirculated air from the exhaust duct 25 and discharges this air through the orifice $a$ into the inlet orifice $b$ of the diffuser 11 in such manner, as previously described, that the impedance imposed to the flow of the recirculated air through the orifice $a$ and diffuser 11 is a minimum. The recirculated air is therefore supplied in large volumes to the outlet 12 of the diffuser and constitutes the major portion of the air drawn into the intake duct 24 by means of the fan 34 so that a very small volume of makeup or fresh air is drawn into the inlet 26 of the duct 24 from atmosphere through the space 27.

On the other hand, when the temperature of the electric discharge device 21 reaches a predetermined high limiting degree, the thermostatic element 42 operates to insert a maximum of the resistance 40 or to completely open the circuit of the motor 38 so that it will operate at its lowest speed or not at all. Under these conditions the fan 37 and restricted orifice $a$ offer such impedance to flow of air through conduit 33 that substantially all of the spent or recirculated air from the casing 23 is discharged from the outlet 30 of the duct 25 through the space 31 into atmosphere. Since the fan 37 no longer operates to discharge a stream of air through the orifice $a$ into the orifice $b$, the space S is no longer blocked off and air flows therethrough into the inlet orifice $b$ of the diffuser 11 at an angle to the axis of the diffuser and, as previously described, imposes a high impedance to flow of air through the diffuser and thus decreases the volume of air passing from the duct 25 through the conduit 33 and the diffuser 11 to the inlet 26 of the duct 24. Hence, since the impedance to flow of air through the diffuser is now at its maximum, the fan 34, in order to force a constant volume of cooling air through the duct 24 and casing 23, draws a large volume of make-up air from atmosphere into the duct through space 27, thus providing maximum cooling of the electric discharge device 21.

For temperatures of the electric discharge device intermediate the limits previously mentioned, the thermostatic element 42 operates to insert varying amounts of the resistance 40 into the circuit of the motor 38 which results in the operation of the motor at variable speeds and the fan 37 is effective to discharge varying amounts of spent or recirculated air through the orifice $a$ into the inlet of the diffuser 11. Under these conditions the impedance to flow of spent air through the diffuser varies substantially inversely in proportion to the amount of such air which is discharged from the orifice $a$, and the amount of make-up air drawn into the inlet 26 of the duct 24 through space 27 varies substantially inversely in proportion to the amount of air passing through the diffuser. Hence it will be seen that the flow control apparatus of my invention functions to provide a very sensitive control of the relative proportions of recirculated and make-up air supplied to the casing 23 for cooling the electric discharge device 21, and accomplishes this control without employing the usual movable vanes and shutters.

While I have shown and described my invention in connection with certain specific embodiments, it will, of course, be understood that I do not wish to be limited thereto, since it is apparent that the principles herein disclosed are susceptible of numerous other applications, and modifications may be made in the arrangement and structure of the elements of the fluid flow control apparatus without departing from the spirit and scope of my invention as set forth in the appended claims.

What I claim as new and desire to secure by Letters Patent of the United States, is:

1. A variable impedance fluid flow control apparatus including in combination a fluid receiving casing, a frustro-conical diffuser duct having its outlet in communication with the interior of said casing and its inlet in the form of a sharp-edged orifice, negative pressure producing means operable for drawing fluid into said casing through said duct, a conduit having a circular round-edged orifice in spaced apart axial alignment with the inlet orifice of said duct, said last orifice having larger area than said inlet orifice, and positive pressure producing means connected with said conduit for discharging a stream of fluid from said second orifice through said inlet orifice into said duct.

2. The combination with a furnace having a draft intake opening and means for inducing a draft of air through said opening into the interior of the furnace, of a frusto-conical diffuser duct having its outlet in sealed communication with said opening and having an inlet in the form of a sharp-edged orifice for imposing relatively high flow impedance only to the suction of air through said diffuser duct, means providing a substantially circular round-edged orifice in spaced axial alignment with the inlet of said duct, said circular orifice having a greater area than that of said inlet, and means operable for discharging a stream of air from said circular orifice into the inlet of said duct with relatively low flow impedance to the discharge.

3. In combination, fluid suction apparatus having a tapering diffuser fluid inlet passage for imposing relatively high flow impedance only to the suction of fluid into said apparatus through said passage and fluid discharge means having an orifice in overlapping spaced apart alinement with the inlet of said diffuser for discharging fluid under pressure into said apparatus with relatively low flow impedance to the discharge.

4. In combination, apparatus having a fluid flow control tube with a sharp edge inlet orifice, fluid discharge means having a discharge orifice in overlapping spaced apart alinement with said inlet orifice for discharging fluid under pressure thereto in the form of a stream flowing through said inlet orifice in lines substantially parallel to the axis of the tube, and fluid suction means for drawing fluid into said tube through the space between said inlet orifice and said discharge orifice in the form of a stream having a relatively large contraction as it flows through said inlet orifice.

5. In combination, an elongated fluid flow control tube having a sharp edge inlet orifice, fluid discharge means having a discharge orifice in spaced apart overlapping relation with said inlet orifice for supplying fluid thereto with relatively low impedance to the flow through said tube only upon operation of said fluid discharge means, and suction means connected with the outlet of said tube for drawing fluid through the opening between said orifices into said tube with relatively high impedance to the flow of fluid through the tube only upon independent operation of said suction means.

KENTON D. McMAHAN.